United States Patent
Raudebaugh

[11] 3,884,092
[45] May 20, 1975

[54] STEERING WHEEL ARM REST ATTACHMENT

[76] Inventor: Stanley E. Raudebaugh, 9937 N.W. 65th Ct., Tamarac, Fla. 33321

[22] Filed: Nov. 21, 1973

[21] Appl. No.: 418,083

[52] U.S. Cl. ................................ 74/558; 74/558.5
[51] Int. Cl. .............................................. B62d 1/06
[58] Field of Search ............ 74/552, 557, 558, 558.5

[56] References Cited
UNITED STATES PATENTS
| | | | |
|---|---|---|---|
| 2,866,357 | 12/1958 | Houghtaling | 74/552 |
| 3,554,052 | 1/1971 | Mross | 74/557 |

Primary Examiner—Samuel Scott
Assistant Examiner—F. D. Shoemaker
Attorney, Agent, or Firm—Baldwin, Egan, Walling & Fetzer

[57] ABSTRACT

An arm rest is disclosed for use on top of an automobile steering wheel to allow the operator of the automobile to rest his forearms during a long drive. Several embodiments show apparatus which may be attached or detached to the rim of the steering wheel as desired, while another form shows the structure formed as an integral part of the steering wheel.

4 Claims, 12 Drawing Figures

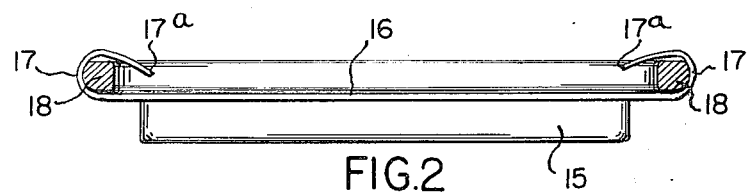
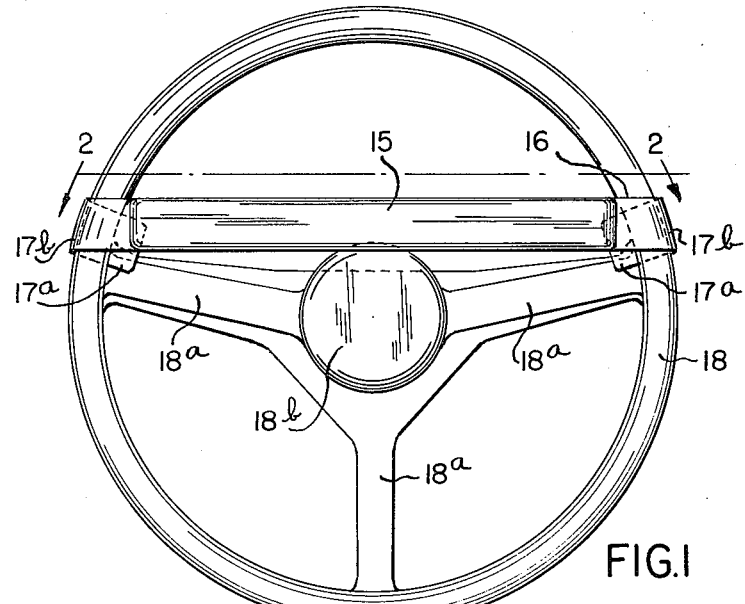
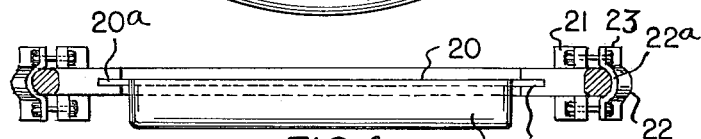
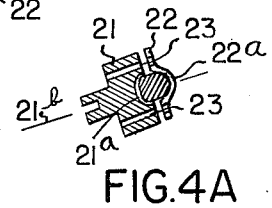
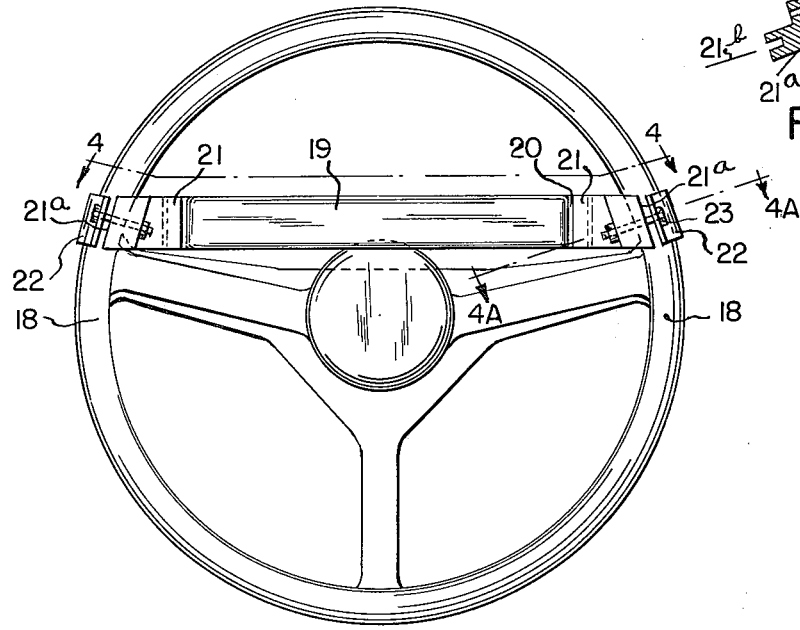

3,884,092

STEERING WHEEL ARM REST ATTACHMENT

BACKGROUND OF THE INVENTION

Some people find that their arms become tired on a long drive in an automobile where their hands continuously grasp the steering wheel and the arms, especially the forearms, become tired. The present invention provides a simple means for resting the forearms of the driver. People who have an arthritic or rheumatic condition in their fingers, hands or arms will find this invention an aid to driving a car safely.

An object of the present invention is to provide a cushion device which may be attached to the rim of a steering wheel of an automobile so that the cushioning device is positioned for the driver to rest his forearms on the cushioning strip while his hands grasp the upper forward rim of the steering wheel.

Other objects and advantages of the invention will be apparent from the accompanying drawings and description and the essential features thereof will be set forth in the appended claims.

In the drawings,

FIG. 1 is a top plan view of an automobile steering wheel equipped with this invention;

FIG. 2 is a sectional view of the same taken along the line 2—2 of FIG. 1;

FIG. 3 is a top plan view of a steering wheel equipped with a second embodiment of this invention;

FIG. 4 is a sectional view of the same taken along the line 4—4 of FIG. 3;

FIG. 4A is a sectional view of the same taken along the line 4A—4A of FIG. 3;

FIG. 10 is a fragmental top plan view of another embodiment of the invention illustrating a small cushion attached at one side of the steering wheel rim, it being understood that another cushion of the same size and type is used diametrically opposite; while

Figure 6:
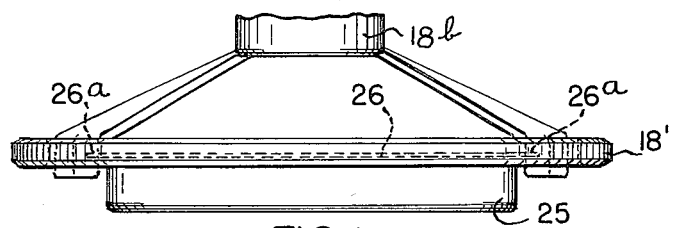
FIG. 6 is an elevational view of the same taken along the line 6—6 of FIG. 5.

Referring to FIGS. 1 and 2, a long, narrow cushion strip 15 is shown extending substantially the full width of the steering wheel at a zone near, and parallel to, a diameter of the steering wheel which is at right angles to the path of travel of the automobile when the steering wheel is in a position corresponding to travel straight ahead. The cushion strip may be made of foam rubber, either with or without a cover extending over the entire cushion strip, or it may consist of a cover completely filled with any known cushion stuffing. A stiffener member 16 is secured to the underside of the cushioning strip in any known manner, such as by adhesive. As its opposite ends, the stiffener member 16 is provided with deformable portions 17 which might be separate members attached to the stiffener member 16, but preferably where the stiffener member is of aluminum or other metal, the portions 17 may be integral therewith and bent over to provide a hook 17a at each end which are spaced and shaped as shown in FIGS. 1 and 2 so as to hold the stiffener member 17 wedged on the wheel rim 18 in a wedged position on the wheel and at one side of the wheel diameter as clearly seen in FIG. 1. If the stiffener member 16 is of a stiff plastic, the portions 17 and 17a may be formed integral therewith at the time of molding the same. Referring to FIG. 1, it will be noted that the bend 17b where each hook portion 17a bends away from the linear stiffening member 16, is inclined downwardly and outward at each end so as to substantially conform to the periphery of the steering wheel rim 18 at the desired final position of the apparatus as shown in FIG. 1.

The steering wheel shown in the drawings is of a known type having a plurality of support arms 18a extending radially inward where they are attached in the usual manner to a steering column 18b.

The device shown in FIGS. 1 and 2 may be applied to the steering wheel rim by slipping it downwardly from the top of the rim as seen in FIG. 1 and then pushed downwardly at each end until it is firmly wedged to the rim 18.

FIGS. 3, 4 and 4A show a second embodiment of the invention wherein the cushion strip 19 is like that described previously at 15 and attached to a stiffener member 20 which has a projection 20a at each end extending in line with the stiffener member 20 for a short distance beyond the outer ends of the cushion strip 19. A block 21 is provided at each end having a slot opening 21b toward the stiffener member and of a size to receive the associated projection 20a snugly. Detachable clamp means 22 is provided for securing each of the blocks 21 to the wheel rim 18. As clearly shown in FIGS. 4 and 4A, the block 21 has an outwardly opening recess 21a adapted to snugly embrace the inner periphery of the rim 18. The clamping means 22 provides an inwardly opening recess 22a adapted to snugly embrace the outer periphery of the rim 18. After the apparatus is in the place shown in FIG. 3, then a bolt and nut combination 23 is provided at the upper and lower sides of the rim 18, at each end of the cushioning device, passing through suitable flanges at the outer edges of the recesses 21a and 22a so as to pull the clamps tightly together at opposite ends of the apparatus in the usual manner of clamps.

Figure 5:
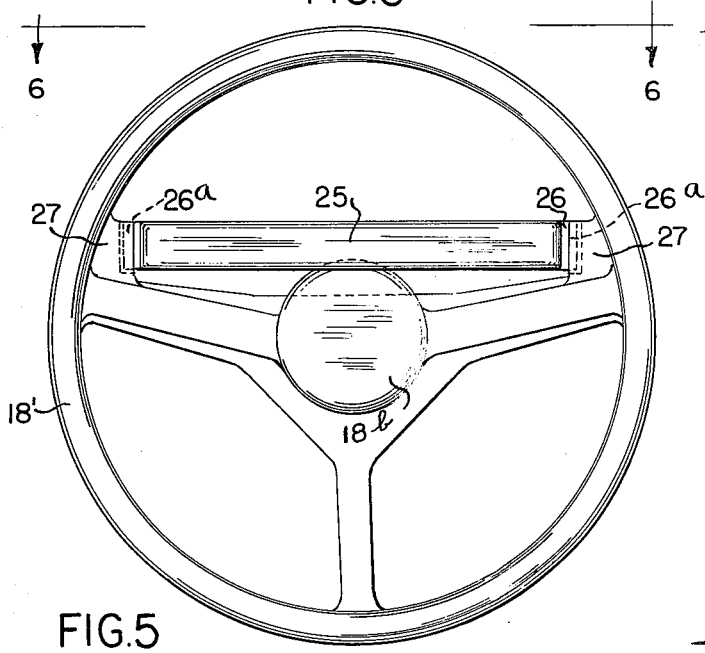
FIG. 5 is a top plan view of a third embodiment of this invention where the same is fixed as an integral part of the steering wheel rim.
Figure 7:
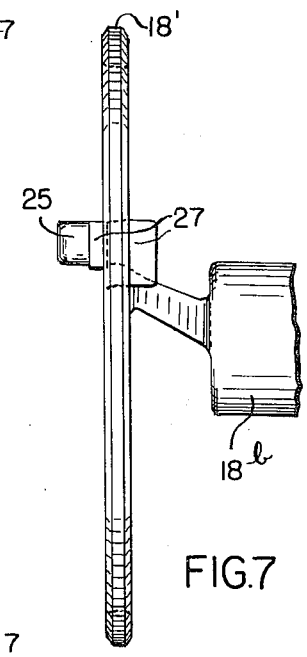
FIG. 7 is a side elevational view of the same taken along the line 7—7 of FIG. 5.

A third embodiment of the invention is shown in FIGS. 5, 6 and 7. Here the cushion strip 25 is like the strip 15 first described and it is secured to a stiffener member 26 extending the entire length of the cusion strip and having a projection 26a at each end like those described at 20a which are linear extensions of the stiffener member 26 and extend for a short distance beyond the ends of the cushion strip 25. Molded integrally with the wheel rim 18' are blocks which have slots opening inwardly so positioned as to receive in each block one of the projections 26a and of a size to hold these projections snugly. The construction is such that the combined structure 25, 26 and 26a may be slipped downwardly as shown in FIG. 5 to cause the projections 26a to enter the described slots in the blocks 27 which open toward the top as seen in FIG. 5. Thus, the cushion strip 25 is held near a diameter of the rim 18' which is at right angles to the path of travel of the automobile when the steering wheel is in a position corresponding to travel straight ahead.

In the embodiment shown in FIGS. 8 through 11, the cushion strip comprises two separate portions with means for securing each portion near the rim of the steering wheel, one at each side thereof, so that in the final position each cushioning member is in a position to hold the forearm of the driver when his hands are grasping the upper forward edge of the steering wheel rim.

Figure 8:
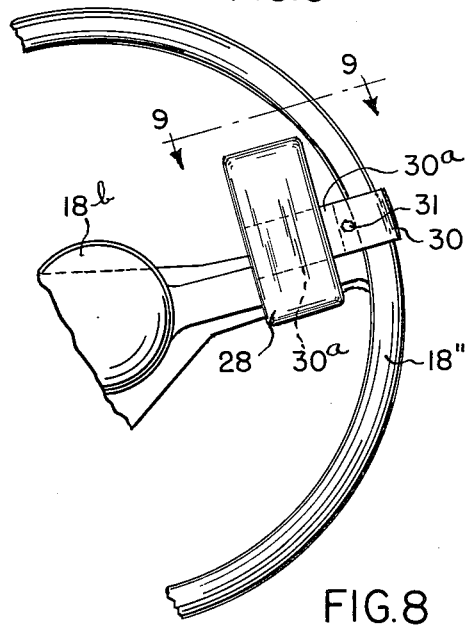
FIG. 8 is a fragmental top plan view of a steering wheel equipped with a small separate cushion attached to the steering wheel rim, it being understood that a similar cushion is provided substantially diametrically opposite.

In FIG. 8, the cushion strip portion 28 is a short rectangular member of any suitable cushion material secured to a stiffening member 29 which underlies the longer dimension of the cushion member 28. Each stiffener member is secured by adhesive or otherwise to an arm 30a of a clamping strip 30 which has a second parallel arm 30b to complete a hool-like clamp which firmly grips the steering wheel rim 18''. When the parts are in the position of FIG. 8, the clamp 30 is pulled down tightly againt the rim 18'' by a bolt and nut structure 31.

As stated before, a second cushion strip member like 28 is secured to the rim 18'' directly across the steering wheel rim 18'' and slightly above the wheel diameter corresponding to the position of 28 shown in FIG. 8.

Figure 9:
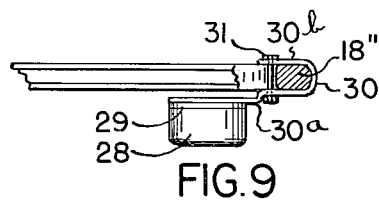
FIG. 9 is a fragmental sectional view taken along the line 9—9 of FIG. 8.
Figure 11:
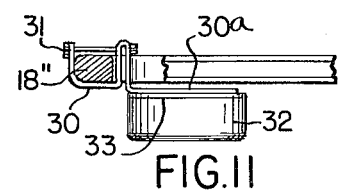
FIG. 11 is a fragmental sectional view taken along the line 11—11 of FIG. 10.
Figure 10:
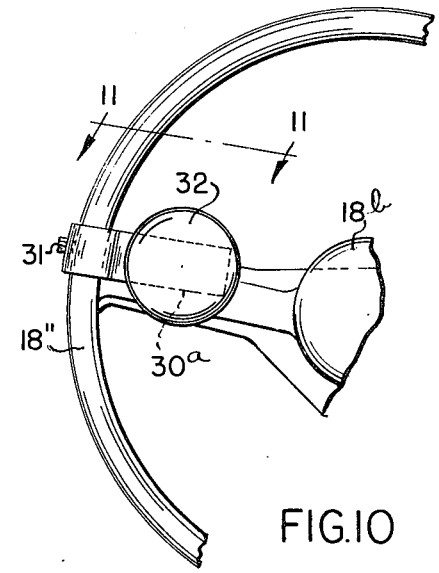

Another embodiment of the invention is shown in FIGS. 10 and 11 which is quite like that already described in FIGS. 8 and 9 except that the cushion strip members performing the same function as 28 in FIG. 8 are circular in shape as shown at 32. A circular stiffening member 33 underlies each of the cushion strips 32 and is secured in position on the steering wheel rim 18'' by a structure exactly like that shown at 30a, 30b and 31 in FIGS. 8 and 9. A second cushion strip portion 32 is provided at the opposite side of the wheel as described in connection with the members 28 described in FIG. 8.

What is claimed is:

1. An armrest for use upon an automobile steering wheel having a rim, comprising a narrow cushion strip which is continuous and extends substantially the full width of said wheel at a zone near a diameter thereof, a stiffener member secured to the under side of said cushion strip and extending the entire width of said wheel at said zone, and means for detachably securing said stiffener member to the rim of said steering wheel including said stiffener member terminating in a deformable portion at each end, and each said deformable portion being bent to provide a hook there, said hooks so spaced and shaped as to hold said stiffener member wedged on said wheel at one side of said wheel diameter.

2. An armrest for use upon an automobile steering wheel having a rim, comprising a narrow cushion strip which is continuous and extends substantially the full width of said wheel at a zone near a diameter thereof, a stiffener member secured to the under side of said cushion strip and extending the entire width of said wheel at said zone, and means for detachably securing said stiffener member to the rim of said steering wheel including a block at each end of said stiffener member, a slot in each block opening toward said stiffener member, said stiffener member having a projection at each end extending beyond said cushion strip in a position and of a size to enter one of said slots snugly, and detachable clamp means for securing each block to said wheel rim.

3. An armrest for use upon an automobile steering wheel having a rim, comprising a narrow cushion strip which is continuous and extends substantially the full width of said wheel at a zone near a diameter thereof, a stiffener member secured to the under side of said cushion strip and extending the entire width of said wheel at said zone, and means for detachably securing said stiffener member to the rim of said steering wheel including two projections integral with said wheel rim and extending generally radially inward and opposite each other on a line parallel to a diameter of said wheel which is at right angles to the path of travel of said automobile when said wheel is in a position corresponding to travel straight ahead, said parallel line being near said diameter, and detachable means for securing opposite ends of said stiffener to said projections respectively.

4. An armrest for use upon an automobile steering wheel having a rim, comprising a narrow cushion strip, a stiffener member secured to the under side of said cushion strip, and means for detachably securing said stiffener member to the rim of said steering wheel wherein said cushion strip comprises two separate portions, two separate stiffener members are secured, one to the under side of each such portion, and said last named means comprises a clamp for securing each of said stiffener members to the rim of said wheel.

* * * * *